(No Model.)

J. GOGERTY.
SOOT CONSUMER AND SPARK ARRESTER.

No. 331,785. Patented Dec. 8, 1885.

Witnesses.
C. C. Clark
F. D. Walker

Inventor.
JOHN GOGERTY
By L. P. Graham
atty.

UNITED STATES PATENT OFFICE.

JOHN GOGERTY, OF DECATUR, ILLINOIS.

SOOT-CONSUMER AND SPARK-ARRESTER.

SPECIFICATION forming part of Letters Patent No. 331,785, dated December 8, 1885.

Application filed February 11, 1885. Serial No. 155,575. (No model.)

*To all whom it may concern:*

Be it known that I, JOHN GOGERTY, a resident of the city of Decatur, county of Macon, and State of Illinois, have invented certain new and useful Improvements in Combined Spark-Arresters and Smoke-Consumers, of which the following is a specification.

The object of my invention is to produce a combined soot-consumer and spark-arrester that will be sufficiently cheap and simple to be of practical use in ordinary stove-pipes, and which may be placed in position in the pipe without the use of rivets or other securing devices.

My invention consists in a conical tubular metallic sheet, perforated at suitable intervals throughout its upper portion, provided on its upper extremity with a heat-retarding plate, and provided at its lower extremity with an imperforate band adapted by size and conformation to precisely intervene between two joints of pipe, or between a joint of pipe and the rim on the pipe-opening of a heating apparatus.

The danger and annoyance that my device is designed to overcome will be readily apparent, as the sparks cannot escape to enkindle a fire, nor the soot accumulate in the smoke-conveyer or become distributed on roofs, &c., to be washed into cisterns, or become a general nuisance in numberless other ways.

Figure 1:
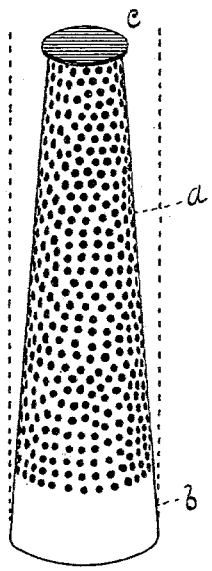
Figure 2:
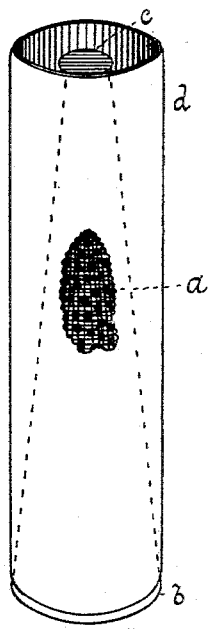

In the drawings accompanying and forming a part of this specification, Figure 1 is a perspective view of my device, and Fig. 2 is a view of a joint of pipe partially broken to show my device in position therein.

*b* represents a solid portion of the pipe, and *a* the perforated portion of the same. *c* is a cap that completely closes the upper end of the pipe, and to a certain extent acts as a damper. *d* is the joint of ordinary stove-pipe, in which my device is represented in Fig. 2.

The dotted lines in Fig. 1 indicate the position of the smoke-conveyer, and the dotted lines in Fig. 2 indicate the position of my device in pipe *d*.

The pipe *a b* may be more or less tapered, and the perforations may be larger or smaller, according as the draft is strong or weak, and the soot-producing capacity of the fuel used less or greater.

Where wood is used as a fuel the taper of the pipe need not be great, and the perforations may be formed of small size. When, on the other hand, bituminous coal is used, the taper should be greater, and the perforations of a size to correspond with the strength of the draft.

In operation the sparks are arrested by contact with the converging sides of the pipe or with the cap at the termination of the same, while the soot accumulates around the perforations and on the sides of the pipe until it becomes ignited and consumed by means of sparks or heat from the stove or other heating device with which it is connected. The plate *c* hastens the combustion of the soot by retarding the heat from passing up the pipe.

The spark-arrester is formed of correct size and shape to fit over a joint of the conveying-pipe, (or over the pipe-opening of the heating apparatus with which it is intended to operate,) and the connection is completed by passing another joint of the conveying-pipe over the plane surface of the spark-arrester, as shown in Fig. 2.

While specially designed for the purpose above set forth, my device is nevertheless adapted to operate as a filter or screen for various substances, under various circumstances, many of which will readily suggest themselves.

Having thus described my invention, I claim as new and desire to secure by Letters Patent—

The combination of a conical tubular soot-collector, perforated at suitable intervals throughout its upper portion, a heat-retarding plate on the upper extremity of the perforated soot-collector, and an imperforate band on the lower portion of the soot-collector, of suitable size and conformation to precisely intervene between pipe-joints, as set forth.

In testimony whereof I sign my name in the presence of two subscribing witnesses.

JOHN GOGERTY.

Attest:
I. D. WALKER,
L. P. GRAHAM.